US011221884B2

(12) United States Patent
Anand et al.

(10) Patent No.: US 11,221,884 B2
(45) Date of Patent: Jan. 11, 2022

(54) HYBRID VIRTUAL MACHINE CONFIGURATION MANAGEMENT

(71) Applicant: International Business Machines Corporation, Armonk, NY (US)

(72) Inventors: Vaijayanthimala K. Anand, Austin, TX (US); Wen-Tzer T. Chen, Austin, TX (US); William A. Maron, Austin, TX (US); Mysore S. Srinivas, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/170,694

(22) Filed: Oct. 25, 2018

(65) Prior Publication Data
US 2019/0065280 A1 Feb. 28, 2019

Related U.S. Application Data

(63) Continuation of application No. 14/948,525, filed on Nov. 23, 2015, now Pat. No. 10,120,726, which is a (Continued)

(51) Int. Cl.
*G06F 9/50* (2006.01)
*G06F 9/455* (2018.01)

(52) U.S. Cl.
CPC ............ *G06F 9/5033* (2013.01); *G06F 9/455* (2013.01); *G06F 9/45533* (2013.01);
(Continued)

(58) Field of Classification Search
CPC .... G06F 9/5077; G06F 9/455; G06F 9/45533; G06F 9/45558; G06F 9/5027;
(Continued)

(56) References Cited

U.S. PATENT DOCUMENTS 7,752,415 B2 * 7/2010 Vaupel ................. G06F 9/5077
711/173
7,958,392 B2 6/2011 Armstrong et al.
(Continued)

OTHER PUBLICATIONS

Barfield, Janel; Configuring Logical Partitions with Virtualization; UNIX Software Services Education, IBM Corporation, 2011.
(Continued)

*Primary Examiner* — Jacob D Dascomb
(74) *Attorney, Agent, or Firm* — James L. Baudino; Brian M. Restauro

(57) ABSTRACT

According to one aspect of the present disclosure, a method and technique for hybrid virtual machine configuration management is disclosed. The method includes assigning to a first set of virtual resources associated with a virtual machine a first priority and assigning to a second set of virtual resources associated with the virtual machine a second priority lower than the first priority. An operating system of the virtual machine is provided with the first and second priorities assigned to the respective first and second sets of virtual resources. The operating system dispatches to process a workload the virtual resources from the first set before dispatching the virtual resources from the second set.

19 Claims, 4 Drawing Sheets

Related U.S. Application Data continuation of application No. 13/775,207, filed on Feb. 24, 2013, now Pat. No. 9,218,190, which is a continuation of application No. 13/717,355, filed on Dec. 17, 2012, now Pat. No. 9,052,932.

(52) U.S. Cl.
CPC ........ *G06F 9/45558* (2013.01); *G06F 9/5027* (2013.01); *G06F 9/5038* (2013.01); *G06F 9/5077* (2013.01); *G06F 2009/45583* (2013.01); *G06F 2209/504* (2013.01); *G06F 2209/5021* (2013.01); *Y02D 10/00* (2018.01)

(58) Field of Classification Search
CPC ......... G06F 9/5038; G06F 2009/45583; G06F 2009/5021; G06F 2009/504; Y02D 10/22
See application file for complete search history.

(56) References Cited

U.S. PATENT DOCUMENTS

| | | |
|---|---|---|
| 8,020,164 B2 | 9/2011 | Barsness et al. |
| 8,024,728 B2 | 9/2011 | Anand et al. |
| 8,095,929 B1 | 1/2012 | Ji et al. |
| 8,527,988 B1 | 9/2013 | Rhine |
| 8,806,166 B2 | 8/2014 | Allen et al. |
| 9,158,592 B2 | 10/2015 | Griglock et al. |
| 9,424,094 B2 * | 8/2016 | Cardosa ............... G06F 9/5077 |
| 2002/0156824 A1 | 10/2002 | Armstrong et al. |
| 2006/0230400 A1 | 10/2006 | Armstrong et al. |
| 2006/0242389 A1 | 10/2006 | Browning et al. |
| 2006/0277551 A1 | 12/2006 | Accapadi et al. |
| 2007/0016683 A1 | 1/2007 | Mathews et al. |
| 2007/0150894 A1 | 6/2007 | Barsness et al. |
| 2007/0226449 A1 | 9/2007 | Akimoto |
| 2008/0077927 A1 | 3/2008 | Armstrong et al. |
| 2008/0163203 A1 | 7/2008 | Anand et al. |
| 2008/0244568 A1 | 10/2008 | Flemming et al. |
| 2008/0295094 A1 | 11/2008 | Korupolu et al. |
| 2009/0007125 A1 | 1/2009 | Barsness et al. |
| 2009/0037922 A1 | 2/2009 | Herington |
| 2009/0204959 A1 | 8/2009 | Anand et al. |
| 2009/0214040 A1 | 8/2009 | Funk et al. |
| 2009/0217283 A1 | 8/2009 | Anand et al. |
| 2009/0237404 A1 | 9/2009 | Cannon, III |
| 2009/0307439 A1 | 12/2009 | Jacobs et al. |
| 2010/0043005 A1 | 2/2010 | Ahuja et al. |
| 2010/0218018 A1 | 8/2010 | Parker, Jr. et al. |
| 2010/0229170 A1 | 9/2010 | Tohana |
| 2010/0287279 A1 | 11/2010 | Vaidyanathan et al. |
| 2010/0333087 A1 | 12/2010 | Vaidyanathan et al. |
| 2011/0078488 A1 | 3/2011 | Hegde et al. |
| 2011/0106922 A1 | 5/2011 | Bouillet et al. |
| 2011/0145505 A1 * | 6/2011 | Anand ................ G06F 12/0895 711/130 |
| 2011/0161979 A1 | 6/2011 | Flemming et al. |
| 2012/0030675 A1 | 2/2012 | Hayakawa et al. |
| 2012/0124576 A1 | 5/2012 | Chiaramonte et al. |
| 2013/0061220 A1 * | 3/2013 | Gnanasambandam ..................... G06F 9/5088 718/1 |
| 2013/0086593 A1 | 4/2013 | Sloma et al. |
| 2013/0227549 A1 | 8/2013 | Accapadi et al. |
| 2013/0239112 A1 * | 9/2013 | Kato .................... G06F 9/5077 718/1 |
| 2014/0007124 A1 | 1/2014 | Ashok et al. |
| 2014/0136801 A1 | 5/2014 | Birkestrand et al. |

OTHER PUBLICATIONS

Virtual Shared Dedicated Pool for disaster management and improved partition availability; www.ip.com electronic publication; Publication No. IPCOM000195837D; May 19, 2010.

* cited by examiner

HYBRID VIRTUAL MACHINE CONFIGURATION MANAGEMENT

BACKGROUND

System virtualization is a technology which can divide a single host (e.g., computer, server, etc.), into multiple parts, or partitions, each running a separate instance, or image, of an operating system. The instances of the operating systems or partitions are separate, or isolated, from each other in some ways. For example, the partitions have separate file systems, separate users, separate applications, and separate processes. However, the partitions may also share some resources of the host. For example, the partitions can share the memory, the kernel, the processors, the hard drives, and/or other software, firmware, and/or hardware of the host. Thus, each partition or instance of the operating system can look and feel like a separate server or machine from the perspective of its users. These instances are commonly referred to as "virtual" or "virtualized" machine, and each partition may be referred to as a logical partition (LPAR).

One server or data processing system can generally host a number of LPARs. These LPARs generally have virtual resources assigned to them (e.g., virtual processors) which provide an abstraction of the physical resource from which it is based (e.g., the physical processor). For example, a virtual resource may be considered a logical entity that is backed up by the physical entity. In a dedicated mode of LPAR operation, physical resources are assigned as a whole to an LPAR such that the assigned physical resources are not shared by other LPARs. In a shared mode of LPAR operation, the physical resources are part of a pool of resources which are shared among the LPARs. Additionally, LPARs can be configured to have a certain entitlement capacity representing a guaranteed physical resource capacity for the LPAR. LPARs may also be configured as capped or uncapped. In a capped mode, the resource capacity for the LPAR is capped at some value (e.g., its entitlement capacity). In an uncapped mode, the LPAR can exceed its entitlement capacity when other shared resources are available.

BRIEF SUMMARY

According to one aspect of the present disclosure a method and technique for hybrid virtual machine configuration management is disclosed. The method includes assigning to a first set of virtual resources associated with a virtual machine a first priority and assigning to a second set of virtual resources associated with the virtual machine a second priority lower than the first priority. An operating system of the virtual machine is provided with the first and second priorities assigned to the respective first and second sets of virtual resources. The operating system dispatches to process a workload the virtual resources from the first set before dispatching the virtual resources from the second set.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
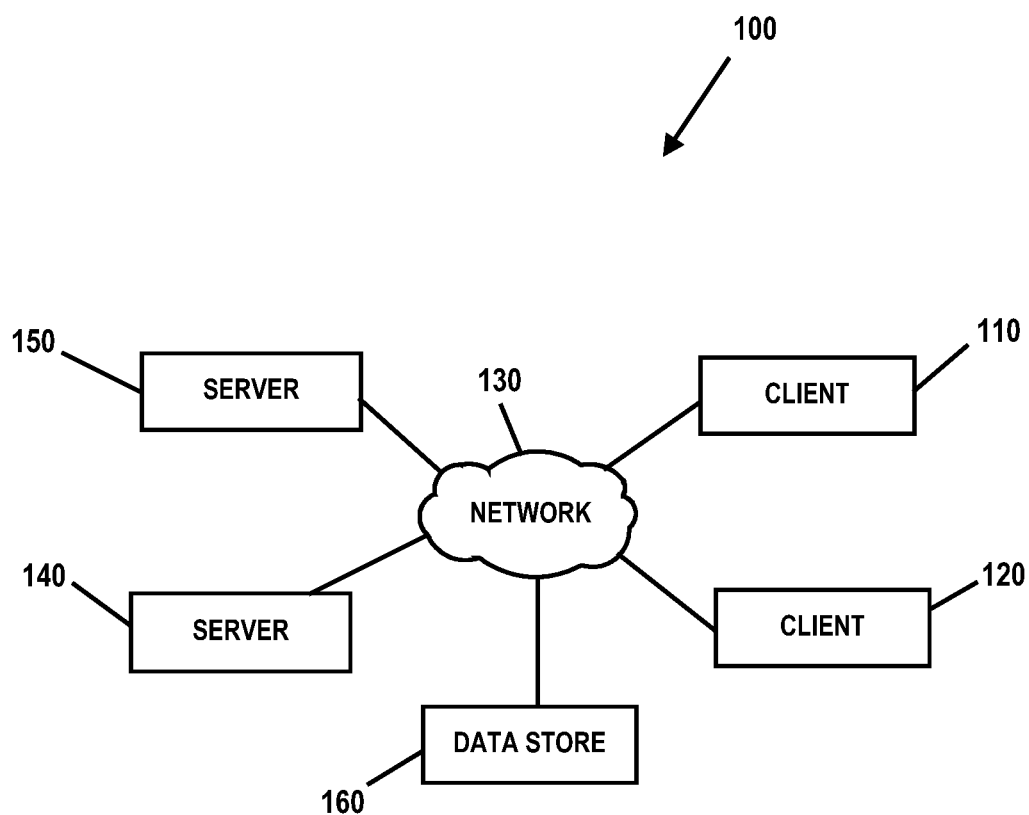
FIG. 1 is an embodiment of a network of data processing systems in which the illustrative embodiments of the present disclosure may be implemented.

Embodiments of the present disclosure provide a method, system and computer program product for hybrid virtual machine configuration management. For example, in some embodiments, the method and technique includes: assigning to a first set of virtual resources associated with entitled resources of a virtual machine a first priority; assigning to a second set of virtual resources associated with the virtual machine a second priority lower than the first priority, wherein the first and seconds sets when combined exceed the entitled resources for the virtual machine; mapping the first set of virtual resources to a first physical resource of a pool of shared physical resources allocatable to the first and second sets of virtual resources, wherein the first physical resource comprises a desired affinity level to a second physical resource allocated to the virtual machine; and preferentially allocating the first physical resource to the first set of virtual resources. Embodiments of the present disclosure enable better affinity levels to be maintained to physical resources in a shared resource pool environment. Embodiments of the present disclosure utilize a prioritization scheme to assign a higher priority to entitlement virtual resources than to virtual resources utilizing uncapped excess resources of the pool. Physical resources having a desired or greatest affinity level to a physical resource of interest are mapped to the high priority virtual resources. In response to the dispatch of a high priority virtual resource, a physical resource allocation preference is given to the high priority virtual resource over a virtual resource that may be utilizing the mapped physical resource in an uncapped, shared mode.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
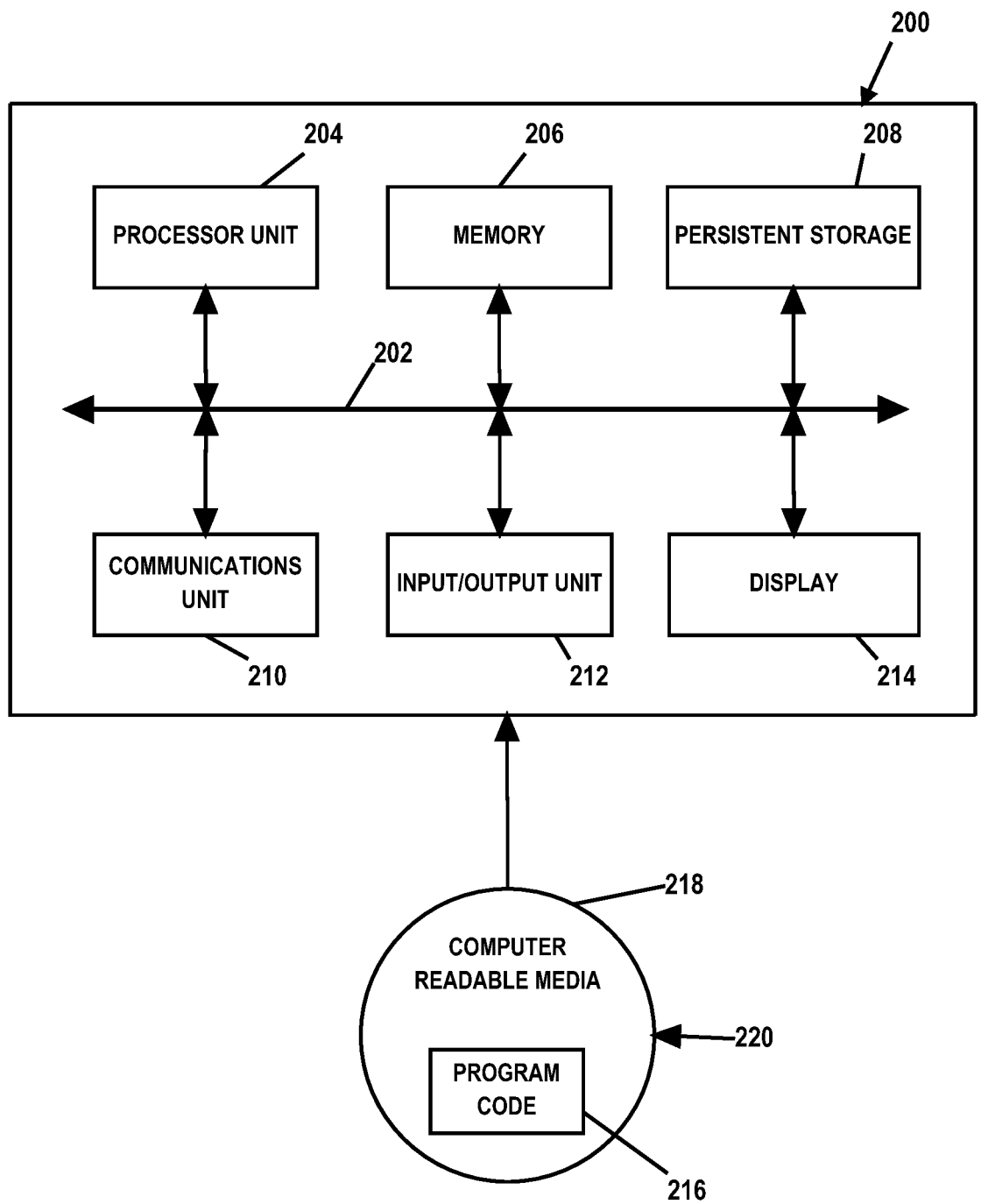
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for hybrid virtual machine configuration management according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
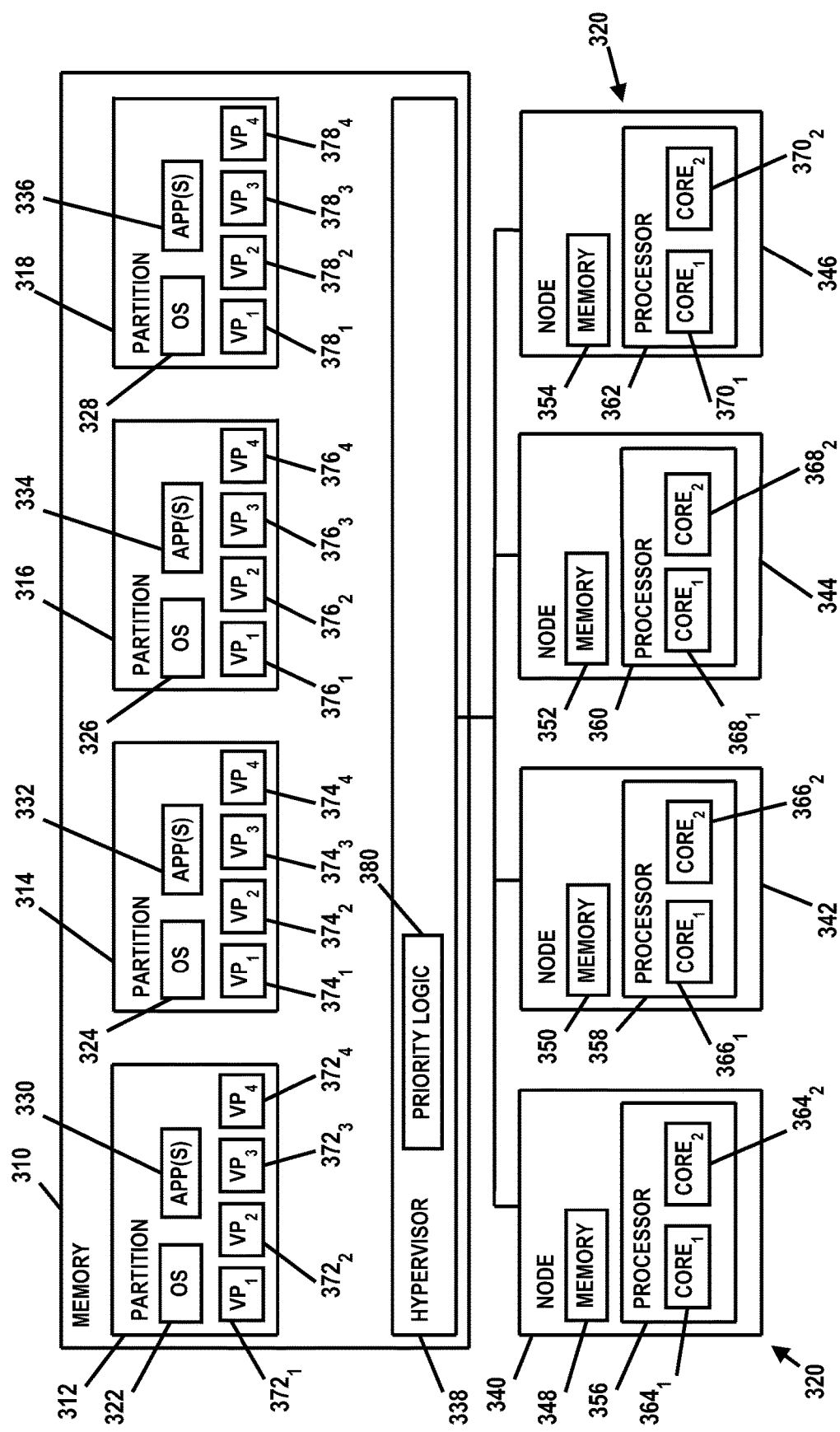
FIG. 3 is a diagram illustrating an embodiment of a data processing system for hybrid virtual machine configuration management in which illustrative embodiments of the present disclosure may be implemented.

FIG. 3 is an illustrative embodiment of a system 300 for hybrid virtual machine configuration management. System 300 may be implemented on data processing systems or platforms such as, but not limited to, servers 140 and/or 150, clients 110 and/or 120, or at other data processing system locations. In the embodiment illustrated in FIG. 3, system 300 is apportioned into logical partitions (LPARs) or virtual machines that may operate independently, each LPAR running its own operating system and applications. In the illustrated embodiment, system 300 includes a memory 310 having LPARs 312, 314, 316 and 318; however, it should be understood that a greater or fewer quantity of LPARs may be provisioned. LPARs are assigned a subset of a computer's physical hardware resources 320 (i.e., a subset of the hardware underlying the computer/server environment) and are virtualized within the computer/server environment as a separate computer/virtual machine. Resources such as processor capacity, memory, or any other type of resource may be assigned to a particular LPAR. Each LPAR has its own virtual operating system (OS) instance (e.g., operating systems 322, 324, 326 and 328 in respective LPARs 320312, 314, 316 and 318), application programs (e.g., application(s) 330, 332, 334 and 336 in respective LPARs 312, 314, 316 and 318) and/or associated files, allowing for multiple operating systems to be simultaneously executing within the server computer/environment.

Logical partitioning is facilitated by logic or software 338 (a "hypervisor") that controls the computer system's hardware and monitors the operating systems of the LPARs. For example, hypervisor 338 may comprise software, logic and/or executable code for performing various functions as described herein (e.g., residing as software and/or an algorithm running on a processor unit). Hypervisor 338 operates at a level between the logical partition operating systems level and computer/server system physical hardware resources 320. Hypervisor 338 may run directly on the computer system's hardware or within a conventional operating system environment, depending upon the implementation.

In the illustrated embodiment, physical resources 320 include a number of integrated circuits (ICs), chips or processing nodes 340, 342, 344 and 346. The quantity and/or types of physical resources may vary. In the illustrated embodiment, each respective node 340, 342, 344 and 346 includes a memory 348, 350, 352 and 354 and a processor 356, 358, 360 and 362. Each processor 356, 358, 360 and 362 may comprise one or more processor cores. For example, processor 356 includes cores $364_1$-$364_2$, processor 358 includes cores $366_1$-$366_2$, processor 360 includes cores $368_1$-$368_2$, and processor 362 includes cores $370_1$-$370_2$. It should be understood that the quantity of cores for any particular node may vary. Nodes 340, 342, 344 and 346 (or components thereof) may comprise a shared physical resource pool (e.g., as to processors 356, 358, 360 and 362, a shared processor pool). The shared pool of physical resources enables a system or apparatus to assign whole and/or partial resources to a logical partition. For example, physical processors 356, 358, 360 and 362 may be configured as a processing pool such that processors 356, 358, 360 and 362 (as well as their respective cores) are shared among numerous logical partitions (e.g., LPARs 312, 314, 316 and 318).

Logical partitions may be assigned virtual resources which may comprise logical entities backed up by corresponding physical entities. For example, logical partitions may be assigned virtual processors which are depictions of physical processors (e.g., processors 356, 358, 360 and 362) that are presented to the operating system of the respective partition. The types of physical resources that may be virtualized may vary. With respect to virtual processors, each virtual processor may represent a processing capacity (e.g., a processing unit) of a physical processor. The processing capacity represented by a virtual processor may be the entire processing capacity of a physical processor or a portion thereof. In the illustrated embodiment, each LPAR 312, 314, 316 and 318 has assigned thereto a number of virtual processors. For example, LPAR 312 includes virtual processors ($VP_1$-$VP_4$) $372_1$-$372_4$. Similarly, LPAR 314 includes virtual processors ($VP_1$-$VP_4$) $374_1$-$374_4$, LPAR 316 includes virtual processors ($VP_1$-$VP_4$) $376_1$-$376_4$, and LPAR 318 includes virtual processors ($VP_1$-$VP_4$) $378_1$-$378_4$. The number of virtual processors assigned to a particular partition and/or an overall computing platform may vary.

In some embodiments, LPARs can be configured to have a certain entitlement capacity or entitled resources representing a guaranteed physical resource capacity for the LPAR. For example, LPAR 312 includes four virtual processors and may have a core entitlement of two such that a two-core processing capacity is guaranteed for LPAR 312. Because the cores may be allocated from a shared processor pool, hypervisor 338 allocates core processing capacity from the shared processor pool as needed, which means the cores provided to LPAR 312 to meet its entitlement may also be used by other LPARs. In an uncapped mode of operation, if LPAR 312 requires additional processing capacity beyond its entitlement, hypervisor 338 may allocate additional cores from the shared processor pool (if available).

Generally, there are multiple storage levels a core may access such as processor caches (L1, L2, L3, etc.), memory (RAM), and disk storage. Further, within each storage level there may be multiple levels of affinity (e.g., determined by the distance between a core and the memory it accesses). The first level of affinity may comprise a memory located on the same chip as the core. A next level of affinity may refer to memory located on a neighbor chip, etc. Because the cores in a shared processor pool may be shared by any LPAR, the core allocated to a LPAR may not be located in its first affinity level. For example, hypervisor 338 may allocate and/or assign memory 348 to LPAR 312. If hypervisor thereafter allocates core $364_1$ or $364_2$ to any of virtual processors $372_1$-$372_4$, a first level affinity is maintained to memory 348. However, if hypervisor 338 assigns a core from one of nodes 342, 344 or 346, second, third or lower affinity levels result from a respective core on nodes 342, 344 or 346 accessing memory 348 on node 340, thereby impacting performance of the workloads running on the LPARs. Embodiments of the present disclosure improve affinity levels to physical resources utilized by LPARs to thereby increase performance.

In the illustrated embodiment, hypervisor 338 includes priority logic 380 for prioritizing various virtual resources and mapping the prioritized virtual resources to certain physical resources such that each LPAR is preferably given physical resources at lower/closer affinity levels. In the illustrative embodiment, the present disclosure is described in the context of memory affinity to physical processors; however, it should be understood that embodiments of the present disclosure may be applied to other types of virtual and physical resources (e.g., input/output (I/O) shared resources). Priority logic 380 may comprise software, logic and/or executable code for performing various functions as described herein (e.g., residing as software and/or an algorithm running on a processor unit). Priority logic 380 prioritizes virtual resources based on a partition's entitlement and based on uncapped virtual resources that may be utilized for excess capacity beyond the partition's entitlement. Priority logic 380 also maps the prioritized virtual resources to certain physical resources (e.g., those physical resources with a desired affinity level to a corresponding or related physical resource) such that the prioritization is used to preferably allocate the mapped physical resources to the prioritized virtual resources and/or preempt the use of the mapped physical resources by virtual resources from another virtual machine.

Priority logic 380 is used to assign entitlement virtual resources (e.g., a set of virtual resources up to a maximum of the partition's entitlement) of an LPAR a higher priority than the virtual resources that may use excess capacity resources from the shared pool. For example, consider that the entitlement of LPAR 312 is two cores, and each virtual processor $372_1$-$372_4$ of LPAR 312 represents a full core capacity. In this example, virtual processor $372_1$ and $372_2$ (i.e., up to two virtual processors based on a two core entitlement) may be given a higher priority level than virtual processors $372_3$ and $374_4$. Virtual processors $372_3$ and $374_4$ may represent virtual resources that may use excess resource capacity in an uncapped mode beyond the two core entitlement of LPAR 312. Priority logic 380 also designates and/or otherwise assigns the higher priority virtual resources a "home" node (i.e., a preferred physical resource location). In the illustrated embodiment, consider that memory 348 of node 340 has been allocated to LPAR 312. Because of the first level affinity of cores $364_1$ and $364_2$ to memory 348, hypervisor 338 may assign node 340 as the "home" node for the prioritized virtual resources (e.g., virtual processor $372_1$ and $372_2$) of LPAR 312. Thus, priority logic 380 is used to map certain physical resources (such as cores $364_1$ and $364_2$) to the higher priority virtual resources (up to the LPAR's entitlement) that provide a desired affinity level. In this example, two priority levels are described; however, it should be understood that a greater number of priority levels may be used and certain physical resources at different affinity levels may be mapped to corresponding virtual resources based on such priorities. Further, in this example, the entitlement capacity equals the resource capacity available from a single node. However, it should be understood that in some instances, the entitlement capacity may be greater than the physical resources available from any one node such that there may be physical resources mapped from more than one node to virtual resources of a particular LPAR.

The priorities assigned to the virtual resources are provided to the operating system of the respective LPAR (e.g., operating system 322 of LPAR 312). In some embodiments, the operating system of the respective LPAR is configured to dispatch the higher priority virtual resources before dispatching the lower priority virtual resources (e.g., to maintain a higher physical resource affinity); however, it should be understood that the operating system may be configured to utilize other scheduling methods for dispatching for virtual resources (e.g., based on workload priorities, processing length, completion deadlines, etc.). In operation, the operating system dispatches the higher priority virtual resources up to the resource entitlement of the LPAR. Hypervisor 338 may identify and/or otherwise determine the home node for the higher priority virtual resources and determine the availability of the physical resources mapped to the higher priority virtual resources. For example, operating system 322 may dispatch virtual processor $372_1$ to process a workload (e.g., from one of applications 330). Hypervisor 338 may determine and/or otherwise identify the priority level assigned to virtual processor $372_1$, determine and/or otherwise identify the home node for virtual processor $372_1$ (e.g., node 340), and allocate physical resources from the home node for virtual processor $372_1$, (e.g., core $364_1$ or $364_2$). If all prioritized or higher priority virtual resources have been dispatched (e.g., both virtual processors $372_1$ and $372_2$), operating system 322 may thereafter dispatch the lower priority virtual resources (e.g., virtual processors $372_3$ and $372_4$). Hypervisor 338 may allocate physical resources to virtual processors $372_3$ and $372_4$ (which represent virtual processors in excess of the entitlement capacity of LPAR 312) from the shared physical resource pool 320. For example, depending on availability, hypervisor 338 may assign core $368_1$ to virtual processor $372_3$ and core $370_1$ to virtual processor $372_4$.

Priority logic 380 may also be used to preempt virtual resources based on the priorities assigned to the various virtual resources. For example, in some embodiments, if physical resources mapped to high priority virtual resources are being used by low priority virtual resources of another virtual machine, the lower priority virtual resources may be preempted to enable the high priority virtual resources mapped to such physical resources access to such physical resources. For example, consider that LPAR 314 also has a two core entitlement and that virtual processors $374_1$ and $374_2$ have been assigned a higher priority level than virtual processors $374_3$ and $374_4$. Node 342 may be designated as the home node for virtual processors $374_1$ and $374_2$ because memory 350 has been assigned/allocated to LPAR 314. In this example, consider that the priority levels are the same across LPARs 312 and 314 (e.g., such that the priority levels for virtual processors $372_1$, $372_2$, $374_1$ and $374_2$ are the same, and that the priority level of virtual processors $372_3$, $372_4$, $374_3$ and $374_4$ are the same, and that the priority level of virtual processors $372_1$, $372_2$, $374_1$ and $374_2$ is higher than the priority level of virtual processors $372_3$, $372_4$, $374_3$ and $374_4$).

In this example, cores $366_1$ and $366_2$ have been allocated to virtual processors $374_1$ and $374_2$. Because of excess workload by LPAR 314, virtual processors $374_3$ and/or $374_4$ may have been dispatched by operating system 324, and hypervisor 338 has allocated physical resources from node 340 (e.g., core $364_1$ and/or $364_2$) as uncapped shared pool resources available to LPAR 314 (e.g., core $364_1$ and/or $364_2$ is currently available due to a light workload level in LPAR 312). If operating system 322 dispatches virtual processor $372_1$ and/or virtual processor $372_2$ (which have been mapped to cores $364_1$ and $364_2$), hypervisor 338 may evaluate the availability of cores $364_1$ and/or $364_2$ and, in response to determining that cores $364_1$ and/or $364_2$ have been allocated to virtual resources of another virtual machine as uncapped excess resources or allocated to virtual resources having a lower priority (e.g., virtual processors $374_3$ and/or $374_4$) than the priority assigned to virtual processor $372_1$ and/or virtual processor $372_2$, hypervisor 338 may preempt virtual processors $374_3$ and/or $374_4$ from cores $364_1$ and/or $364_2$ to enable access to core $364_1$ and/or $364_2$ by virtual processor $372_1$ and/or virtual processor $372_2$. Thus, the lower priority level virtual resources are preempted from utilizing physical resources that have been mapped to higher priority virtual resources if needed by such higher priority virtual resources. If preempted, hypervisor 338 may re-assign the preempted virtual resources to other physical resources available from the resource pool (e.g., re-assign virtual processor $374_3$ to core $370_1$ if available).

Figure 4:
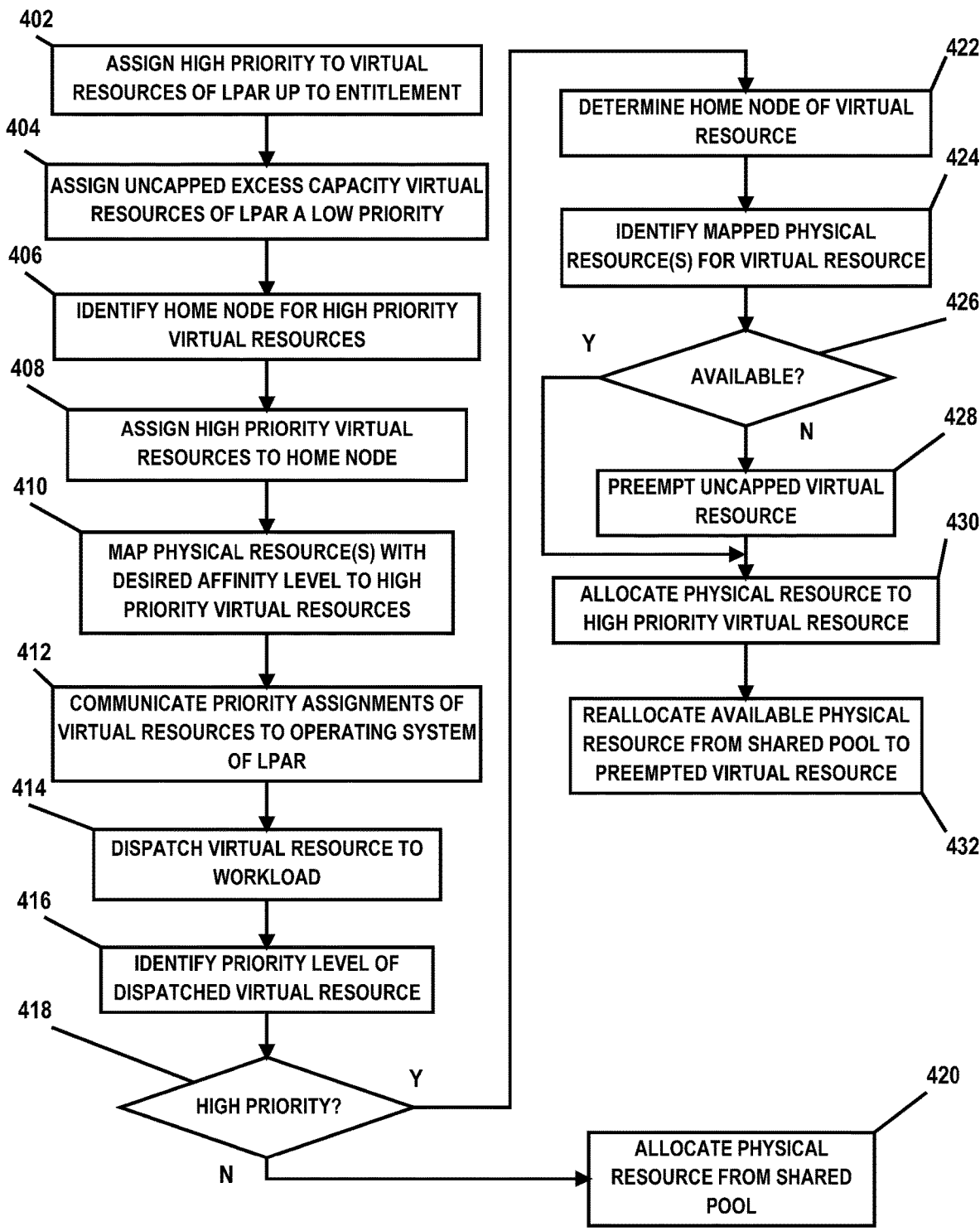
FIG. 4 is a flow diagram illustrating an embodiment of a method for hybrid virtual machine configuration management according to the present disclosure.

FIG. 4 is a flow diagram illustrating an embodiment of a method for hybrid virtual machine configuration management. The method begins at block 402, where priority logic 380 is used to assign a high priority level to virtual resources of a LPAR up to the entitlement capacity of the LPAR. At block 404, priority logic 380 is used to assign a lower priority level to virtual resources of the LPAR that may use excess entitlement capacity resources from the shared resource pool. At block 406, hypervisor 338 identifies a home node for the high priority virtual resources (e.g., based on a desired or best affinity level to particular physical resources). At block 408, hypervisor 338 assigns the high priority virtual resources to the determined home node. At block 410, hypervisor 338 maps physical resources (e.g., cores) with a desired affinity level to another physical resource(s) (e.g., memory) to the high priority virtual resources. At block 412, hypervisor 338 communicates the assigned priority level information to the operating system of the LPAR.

At block 414, the operating system of the LPAR dispatches a virtual resource to a workload. At block 416, hypervisor identifies the priority level of the dispatched virtual resource. At decisional block 418, a decision is made whether the dispatched virtual resource has a high or low priority level. If the dispatched virtual resource has a low priority level, the method proceeds to block 420, where hypervisor 338 allocates an available physical resource from the pool of shared physical resources. If it is determined at block 418 that the dispatched virtual resource has a high priority level, the method proceeds to block 422, where hypervisor 338 determines the home node of the virtual resource. At block 424, hypervisor 338 identifies mapped physical resources for the high priority virtual resource.

At decisional block 426, a determination is made whether the physical resources mapped to the high priority virtual resource is available. If the mapped resource is unavailable (e.g., being utilized as an uncapped excess shared resource by another virtual machine), the method proceeds to block 428, where hypervisor 338 preempts the current virtual resource from the mapped physical resource. The method then proceeds to block 430. If at decisional block 426 it is determined that the mapped physical resource is available, the method proceeds to block 430, where hypervisor 338 allocates the mapped physical resource to the high priority virtual resource. At block 432, hypervisor 338 reallocates physical resources from the shared physical resource pool to the preempted virtual resource.

Thus, embodiments of the present disclosure enable better affinity levels to be maintained to physical resources in a shared resource pool environment. Embodiments of the present disclosure utilize a prioritization scheme to assign a higher priority to entitlement virtual resources than to virtual resources utilizing uncapped excess resources of the pool. Physical resources having a desired or greatest affinity level to a physical resource of interest are mapped to the high priority virtual resources. In response to the dispatch of a high priority virtual resource, a physical resource allocation preference is given to the high priority virtual resource over a virtual resource that may be utilizing the mapped physical resource in an uncapped, shared mode.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    assigning to a first set of virtual resources associated with a virtual machine a first priority;
    assigning to a second set of virtual resources associated with the virtual machine a second priority lower than the first priority, wherein the physical resources corresponding to the first set have a greater level of affinity than physical resources corresponding to the second set, and wherein the second set of virtual resources are uncapped virtual resources for another virtual machine, and wherein assigning to a second set of virtual resources associated with the virtual machine a second priority lower than the first priority utilizes a prioritization scheme to assign a higher priority to entitlement virtual resources than to virtual resources utilizing uncapped excess resources of the pool;
    providing to an operating system of the virtual machine the first and second priorities assigned to the respective first and second sets of virtual resources based on respective levels of affinity; and
    preferentially dispatching by the operating system to process a workload the virtual resources from the first set before dispatching the virtual resources from the second set.

2. The method of claim 1, further comprising dispatching the virtual resources of the first set up to a resource entitlement of the virtual machine.

3. The method of claim 1, further comprising determining a home node of the virtual resources of the first set.

4. The method of claim 1, further comprising determining an availability of the physical resources mapped to the virtual resources of the first set.

5. The method of claim 1, further comprising determining if the physical resources mapped to the virtual resources of the first set are being used by virtual resources of another virtual machine.

6. The method of claim 1, further comprising:
    determining if the physical resources mapped to the virtual resources of the first set are being used by lower priority virtual resources of another virtual machine; and
    responsive to determining that the physical resources mapped to the virtual resources of the first set are being used by lower priority virtual resources of the another virtual machine, preempting use of the of the physical resources by the lower priority virtual resources of the another virtual machine.

7. The method of claim 1, further comprising: mapping physical resources having a greater affinity level to a physical resource to high priority virtual resources; and in response to a dispatch of a high priority virtual resource, giving a physical resource allocation preference to a high priority virtual resource over a virtual resource that is utilizing a mapped physical resource in an uncapped, shared mode.

8. A system, comprising:
    a processor; and
    logic executable by the processor to:
        assign to a first set of virtual resources associated with a virtual machine a first priority;
        assign to a second set of virtual resources associated with the virtual machine a second priority lower than the first priority, wherein the physical resources corresponding to the first set have a greater level of affinity than physical resources corresponding to the second set, and wherein the second set of virtual resources are uncapped virtual resources for another virtual machine, and wherein assigning to a second set of virtual resources associated with the virtual machine a second priority lower than the first priority utilizes a prioritization scheme to assign a higher priority to entitlement virtual resources than to virtual resources utilizing uncapped excess resources of the pool;
        provide to an operating system of the virtual machine the first and second priorities assigned to the respective first and second sets of virtual resources; and
        preferentially dispatch by the operating system to process a workload the virtual resources from the first set before dispatching the virtual resources from the second set.

9. The system of claim 8, wherein the logic is executable to dispatch the virtual resources of the first set up to a resource entitlement of the virtual machine.

10. The system of claim 8, wherein the logic is executable to determine a home node of the virtual resources of the first set.

11. The system of claim 8, wherein the logic is executable to determine an availability of the physical resources mapped to the virtual resources of the first set.

12. The system of claim 8, wherein the logic is executable to determine if the physical resources mapped to the virtual resources of the first set are being used by virtual resources of another virtual machine.

13. The system of claim 8, wherein the logic is executable to: determine if the physical resources mapped to the virtual resources of the first set are being used by lower priority virtual resources of another virtual machine; and responsive to determining that the physical resources mapped to the virtual resources of the first set are being used by lower priority virtual resources of the another virtual machine, preempt use of the of the physical resources by the lower priority virtual resources of the another virtual machine.

14. A computer program product for hybrid virtual machine configuration management, the computer program product comprising:

a non-transitory computer readable medium having computer readable program code embodied therewith, the computer readable program code comprising computer readable program code configured to:

assign to a first set of virtual resources associated with a virtual machine a first priority;

assign to a second set of virtual resources associated with the virtual machine a second priority lower than the first priority, wherein the physical resources corresponding to the first set have a greater level of affinity than physical resources corresponding to the second set, and wherein the second set of virtual resources are uncapped virtual resources for another virtual machine, and wherein assigning to a second set of virtual resources associated with the virtual machine a second priority lower than the first priority utilizes a prioritization scheme to assign a higher priority to entitlement virtual resources than to virtual resources utilizing uncapped excess resources of the pool;

provide to an operating system of the virtual machine the first and second priorities assigned to the respective first and second sets of virtual resources; and preferentially dispatch by the operating system to process a workload the virtual resources from the first set before dispatching the virtual resources from the second set.

15. The computer program product of claim 14, wherein the computer readable program code is configured to dispatch the virtual resources of the first set up to a resource entitlement of the virtual machine.

16. The computer program product of claim 14, wherein the computer readable program code is configured to determine a home node of the virtual resources of the first set.

17. The computer program product of claim 14, wherein the computer readable program code is configured to determine an availability of the physical resources mapped to the virtual resources of the first set.

18. The computer program product of claim 14, wherein the computer readable program code is configured to determine if the physical resources mapped to the virtual resources of the first set are being used by virtual resources of another virtual machine.

19. The computer program product of claim 14, wherein the computer readable program code is configured to:

determine if the physical resources mapped to the virtual resources of the first set are being used by lower priority virtual resources of another virtual machine; and responsive to determining that the physical resources mapped to the virtual resources of the first set are being used by lower priority virtual resources of the another virtual machine, preempt use of the of the physical resources by the lower priority virtual resources of the another virtual machine.

\* \* \* \* \*